(12) United States Patent
Saikkonen et al.

(10) Patent No.: US 8,301,312 B2
(45) Date of Patent: Oct. 30, 2012

(54) FAULT SITUATION PROCESSING ARRANGEMENT OF A LOAD DISTRIBUTION SYSTEM OF A LOCAL ELECTRIC POWER TRANSMISSION NETWORK

(75) Inventors: Ari Saikkonen, Vaasa (FI); Tom Kaas, Solf (FI)

(73) Assignee: Wärtsilä Finland Oy, Vaasa (FI)

( * ) Notice: Subject to any disclaimer, the term of this patent is extended or adjusted under 35 U.S.C. 154(b) by 358 days.

(21) Appl. No.: 12/810,433

(22) PCT Filed: Dec. 2, 2008

(86) PCT No.: PCT/FI2008/050703
§ 371 (c)(1),
(2), (4) Date: Jun. 24, 2010

(87) PCT Pub. No.: WO2009/083640
PCT Pub. Date: Jul. 9, 2009

(65) Prior Publication Data
US 2010/0287419 A1 Nov. 11, 2010

(30) Foreign Application Priority Data

Dec. 27, 2007 (FI) ..................... 20075965

(51) Int. Cl.
G05D 3/12 (2006.01)
G05D 5/00 (2006.01)
G05D 9/00 (2006.01)
G05D 11/00 (2006.01)
G05D 17/00 (2006.01)
G01R 31/00 (2006.01)
G01R 19/00 (2006.01)
H02H 9/00 (2006.01)
H02H 7/00 (2006.01)
H02J 1/00 (2006.01)
H02J 3/00 (2006.01)
H02P 9/00 (2006.01)

(52) U.S. Cl. ............ 700/292; 700/287; 702/58; 702/64; 307/69; 307/78; 307/84; 322/44; 361/18; 361/21

(58) Field of Classification Search ................. 700/286, 700/287, 292, 293, 297, 298; 702/57–59, 702/64; 290/40 R, 40 C; 307/43, 64, 65, 307/69, 71, 77, 78, 84; 322/44; 323/207; 340/521; 361/1, 18, 20, 21
See application file for complete search history.

(56) References Cited

U.S. PATENT DOCUMENTS 4,977,390 A * 12/1990 Saylor et al. .................. 340/521
(Continued)

OTHER PUBLICATIONS

Kai Huang, et al., A novel algorithm for agent based reconfiguration of ring-structured shipboard power system, Industry Applications Conference, 2005. Fourtieth IAS Annual Meeting. Conference Record of the 2005 Hong Kong, China Oct. 2-6, 2005, Piscataway, N.J., USA, IEEE, vol. 2, Oct. 2, 2005, pp. 1311-1316.

(Continued)

*Primary Examiner* — Crystal J Barnes-Bullock
(74) *Attorney, Agent, or Firm* — Muncy, Geissler, Olds & Lowe, PLLC

(57) ABSTRACT

A processing arrangement for the fault situation of a local electric power transmission grid comprises a generator-specific element arranged to monitor the fault situation of a data communication bus and the statuses of the switches of the electric power transmission network and to compare the status data concerning the same switch. In case of a fault situation the generators change into droop control only if there are no other possibilities to continue with the normal adjustment of the generator.

11 Claims, 4 Drawing Sheets

U.S. PATENT DOCUMENTS

| | | | |
|---|---|---|---|
| 5,095,221 A * | 3/1992 | Tyler ............................ 290/40 C |
| 5,715,124 A * | 2/1998 | Votava et al. .................... 361/20 |
| 6,121,693 A | 9/2000 | Rock |
| 7,023,672 B2 * | 4/2006 | Goodfellow et al. ............ 361/18 |
| 7,091,703 B2 * | 8/2006 | Folts et al. ..................... 323/207 |
| 7,239,035 B2 * | 7/2007 | Garces et al. .................... 290/43 |
| 7,457,688 B2 * | 11/2008 | Szepek et al. .................. 700/287 |
| 7,710,081 B2 * | 5/2010 | Saban et al. ..................... 322/89 |
| 7,761,190 B2 * | 7/2010 | Delmerico et al. ........... 700/297 |
| 7,863,773 B2 * | 1/2011 | Bourgeau et al. ............... 307/64 |
| 7,933,101 B2 * | 4/2011 | Bourgeau et al. ............... 361/21 |
| 2004/0117077 A1 | 6/2004 | Kahle et al. |
| 2009/0292488 A1 * | 11/2009 | Ingham et al. .................. 702/64 |

OTHER PUBLICATIONS

Charlie Adams, et al., Reliable plant power using smart connections,IEEE Industry Applications Magazine, Sep./Oct. 2005, pp. 12-21.

\* cited by examiner

FAULT SITUATION PROCESSING ARRANGEMENT OF A LOAD DISTRIBUTION SYSTEM OF A LOCAL ELECTRIC POWER TRANSMISSION NETWORK

FIELD OF INVENTION

The present invention relates to a local electric power transmission network to which electricity-producing devices and loads can be connected, and to a load distribution arrangement of the network. The invention especially relates to electrical power transfer networks in power plants and ships.

BACKGROUND ART

The electric power transmission networks of ships and power plants are relatively small. Generators are connected thereto for supplying the ship's demand of electric power. Each generator is driven by a power source, such as a diesel engine. The generators run in the electric network at the same speed so as to have the same frequency in all places of the electric network. It is not possible to economically store electricity, so the production of electricity must correspond to the consumption of electricity of the network. Thus there must be some kind of arrangement in the power transmission network for distributing the load among the generators.

A known way is to use droop adjustment, i.e. deviation adjustment. Each generator has a power production line as a function of the frequency of the network. When the load is large, the frequency of the network tends to increase, and when the load is small, the frequency tends to decrease. Thus, the disadvantage is that the frequency of the constant state of the system depends on the load of the system.

Another way is to use so-called isochronic load distribution. In this method the average load of the system is used for establishing the set values for the generators for distributing the load. The principle of isochronic adjustment is similar to deviation adjustment, but it does not depend so much on the load of the network. In an isochronic load distribution the generators of the network are made to run well so that they produce the same frequency regardless of the load of the network.

Use of digital data communication buses for replacing the older analogue buses used for load distribution among generators has become more common. The advantages of digital buses are their accuracy, reliability and robustness. With a digital solution, it is, however, difficult to mimic an analogue power transmission network. Currently the digital data bus solution is the prevailing solution. Often a CAN bus is used as the data communication bus. Usually isochronic load distribution is used. Each generator of the network updates its process values which are presented in a data vector in its generator-specific part. The data vector is broadcast to other generators of the network. The updated part of the vector contains generator-specific signal and parameter data needed for isochronic load distribution. If one or more generators of the network is unable to send updated data, the load distribution arrangement can not execute load distribution.

The power transmission network comprises switches the state of which can be changed, if necessary, either automatically or manually. If switch is incorrectly open or closed, the generator might send incorrect data for the isochronic load distribution.

BRIEF DESCRIPTION OF THE INVENTION

The aim of the invention is to reduce the above-mentioned disadvantages. The aim is achieved as described in the main claim. The dependent claims describe the various embodiments of the invention.

A fault situation processing arrangement of a load distribution system of a local electric power transmission network comprises a fault situation processing element 18 designed to be installed into each generator of the electric power transmission network, each generator of the network being connectable to other generators via two separate connection routes provided with switches 2, 3. The power transmission network is a line or a loop and the generators have consecutive identifiers. The generators are connected to each other via a data communication bus. The fault situation processing element is arranged to monitor the fault situation of the data communication network/bus and the statuses of the switches of the electric power transmission network, to compare the status data concerning the same switch, to change into droop control in case the status data of a switch do not correspond in the comparison and when there is no fault situation in the data communication bus or if data communication faults occur in connection with adjacent generators or in connection with the first and last generator of the network and to replace the status data of a switch with the status data of the adjacent generator concerning the same switch when there are no data communication faults in connection with adjacent generators or in connection with the first and last generator of the network and the status data of the switch do not correspond in the comparison. The purpose of the arrangement is to have the generators change into droop control only if there are no other possibilities to continue with the normal adjustment of the generator.

LIST OF FIGURES

In the following the invention is described in more detail by reference to the figures in the appended drawings, in which FIG. 1 illustrates an example of the power transmission network connection of the generator according to the invention, FIGS. 2 and 3 illustrate the possible network topologies, FIG. 4 illustrates the outlining of the network, FIG. 5 is an example of a data communication vector sent in the communication bus, FIG. 6 is an example of the inventive arrangement.

DESCRIPTION OF THE INVENTION

Figure 1:
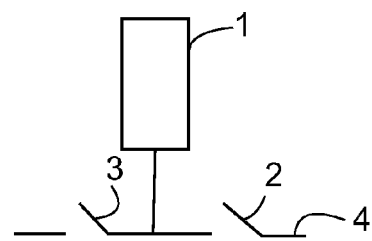
Figure 2:
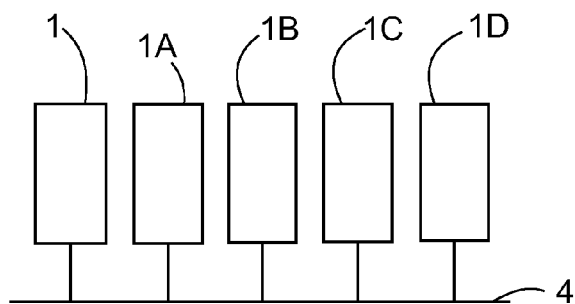
Figure 3:
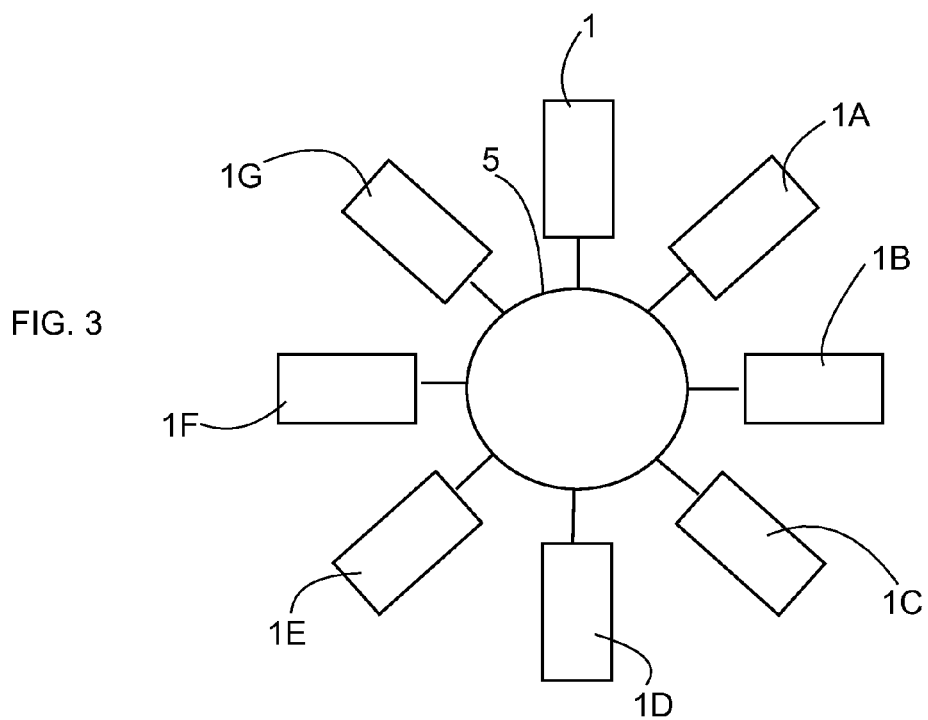

FIGS. 1-3 illustrate the structures and networks of the local electric power transmission network into which the invention is designed to be installed.

FIG. 1 illustrates an example of a generator 1 and its connection to a power transmission network 4. As can be seen, the generator is connected to the power transmission network by two switches 2, 3. Thus, the part between the switches can be interpreted as being a part of the power transmission network, because electric current can flow via it when at least one switch is closed. Due to two switches, electric power can be fed from the generator to both directions of the power transmission network 4 or to either direction only i.e. to belong to the desired part of the electric network. Generator 1 is driven by, for example, an internal combustion piston engine or a gas turbine. Due to the use of two generator-specific switches the power transmission network is very adaptable. Thus, each generator has two connection routes to the rest of the network.

FIGS. 2 and 3 illustrate the possible network topologies. The power transmission network 4, 5 can be a line or a loop. Only these network topologies are possible. In relatively small networks, local networks such as in ships or power plants, this is not a disadvantage. In fact, this can facilitate planning of the network. Even though the figures do not show the loads, it is obvious that loads can be connected to the electric power transmission network.

Each generator 1-1G has its own identifier. Consecutive machines in the network have consecutive identifiers. If a new generator is added to a point in an existing network, it and the generators after it must be given a new identifier. Thus the identifier of the generator can be used for outlining the position of the generator, as is shown later.

Figure 5:
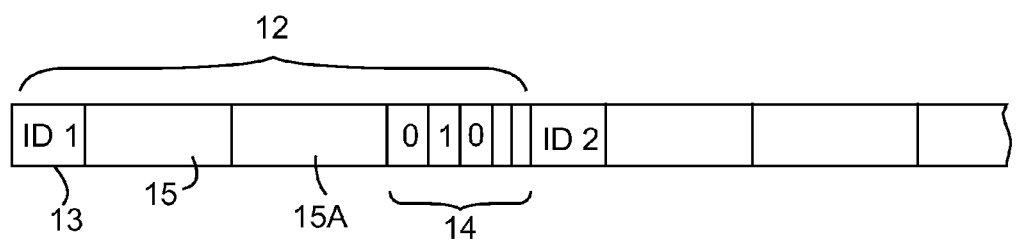

In order to make isochronic load sharing possible, a number of parameters/signals must be transmitted between generators. A CAN bus (Controller Area Network) 6 is used for transmitting the data. The transmission takes place as a broadcast transmission, i.e. all generators see the same data. The data are sent in, for example, a data vector (FIG. 5) comprising generator-specific elements 12. Preferably the generator-specific element begins with the generator identifier 13, subsequent to which there are fields for various signal data, parameters 15, 15A and status data 14 of the switches. Each generator updates the element directed to it.

Figure 4:
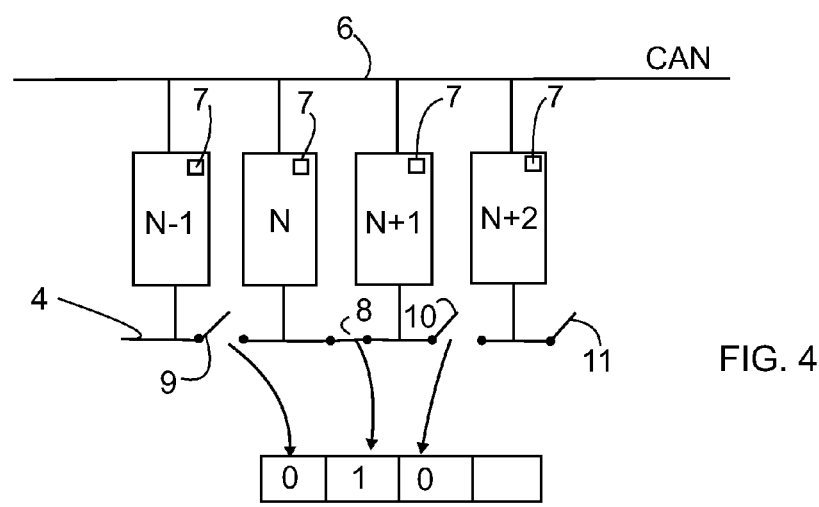

The statuses of the switches of the power transmission network are also determined. The determining is made by measuring, for example, wave impedance from the power transmission network for determining whether the switches are closed or open. The determining process is started in one direction in the network. It is preferable to determine the checking directions and sequence in order to utilize the generator-specific identifiers. In this text the directions are determined either "forward" or "backward". In the situation of FIG. 4 the generator N+1 starts determining the statuses of the switches "backwards", whereby the first encountered switch 8 is observed to be closed, i.e. its status value is 1 in this example. The network determining element 7 can from this measurement detect that the generator N belongs to the same area of the power transmission network belonging to the same electric circuit. The determining of status is continued "backwards", until the switch 9, being open, is detected. Such a switch gets a status of 0. An open switch means that the following generator does not belong to the same area of the power transmission network and the checking in that direction can be ended. All switches that have been detected to be closed simultaneously indicate the generators (the generator following the switch) belonging to the same group. This is possible by using consecutive generator-specific identifiers.

When one direction has been checked, the opposite direction will be checked, i.e. in the case of FIG. 4, "forward". It is detected that the first switch 10 to be checked is open, i.e. it receives a status of zero, and the check in direction "forward" is ended. Thus the switch 11 is no more checked.

With the measured status data of the switches the network determination element can model the area of the power transmission network forming a common electric circuit. The status data of the switches are positioned in the field 14 of the generator-specific element 12 of the data vector reserved for the status data of the switches. See FIG. 5. The data vector is broadcast via the CAN bus to other generators. All generators can, when necessary, receive the information about the status data checks of the switches made by other generators through the broadcast data vector.

Load distribution can not be correctly carried out in isochronic mode if the data communication does not for some reason succeed via the data communication bus, such as the CAN bus. Already the lack of data for one generator is sufficient for carrying out the load distribution. It is also possible that the switch has a fault and its status data are incorrect. In this case the load distribution is incorrect and it disrupt the network or a part of the network.

Figure 6:
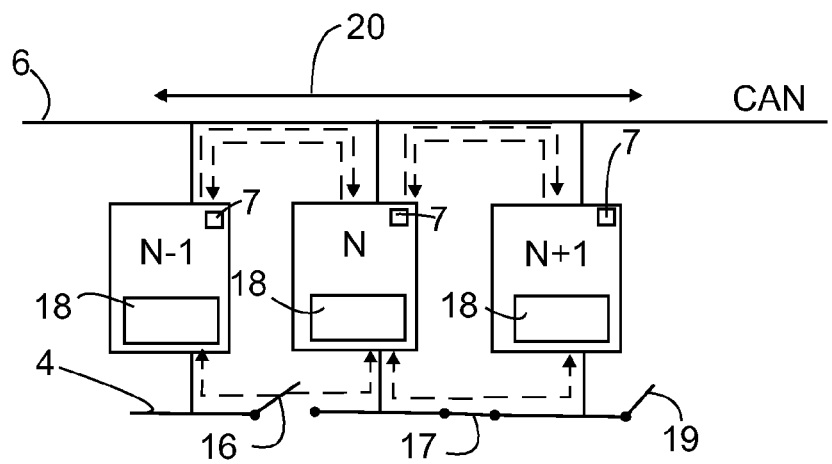
Figure 7:
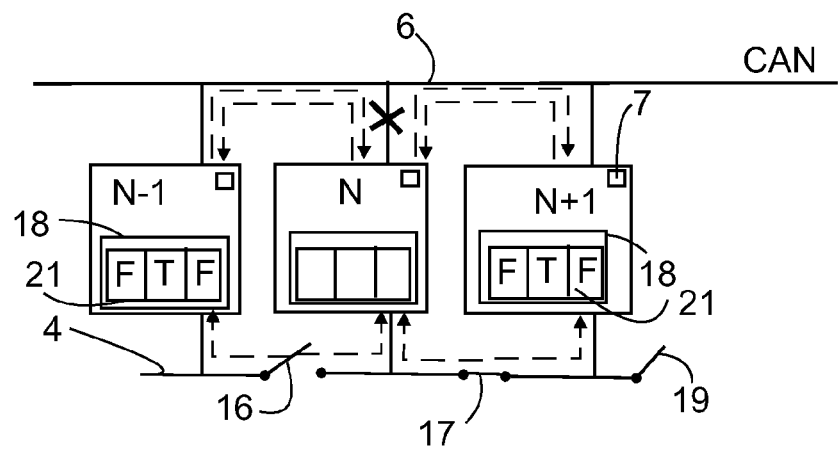
FIG. 7 is an example of the inventive arrangement during a fault of the data communication bus.

FIGS. 6 and 7 illustrate an example of the arrangement according to the invention. In FIG. 6 the generators monitor the status of the switches 16, 17, 19 of the network. The statuses of the switches are marked in the data vector as shown in FIG. 4. The data vector is sent to other generators via the CAN bus whereby all generators receive the information about the statuses of all switches of the network. In the figures it can be seen that two status data measurements can be made for each switch. If these measurements differ from each other and the reason for the difference is not a fault of the data communication bus (i.e. the generator has received status data about the same switch from another generator), the fault situation processing element 18 located in connection with the generator transfers the generator from normal adjustment to droop adjustment. Normally the adjustment of the generator is made as an isochronic adjustment.

For example, if the status data based on measurements made by generators N−1 and N of the switch 16 differ from each other, load distribution is not made in this area of the network and all generators of the network area are changed over to droop adjustment. This is possible, because the status data of the switches are broadcast 20 to all generators. In other words, not only the generators adjacent to switch 16 are changed to droop adjustment, but also the generator N+1 is changed, as it belongs to the same part of the network when the switch 17 is closed. If switch 17 were open, the generator N+1 would belong to a different area/part of the network and it would continue normally in isochronic adjustment.

FIG. 7 illustrates an example of the data communication bus. The CAN bus/network fault in the example prevents the generator N from sending a data vector. Other generators update the data communication bus fault vector 21 being in connection with the fault situation processing element. The fault vector contains a position for each generator of the network. If one generator does not send the data, the applicable position of the fault vector receives a certain value, such as true. In case there is a fault in the data communication bus, the system will determine whether adjacent generators or the first and last generator of the bus have faults. For example, if there is one fault in the bus or the faults are not in adjacent generators or in the first and last generator of the bus, the missing status data of the bus/network can be replaced by the data based on a measurement made for the switch by another adjacent generator. Thus, in the example of the figure the status data regarding the switch of generator N is replaced by the status data of generator N−1 regarding the same switch. The status data of switch 17 are correspondingly replaced by the status data of generator N+1 regarding the switch 1. Thus the network can continue normal operation. The processing arrangement of the fault situation thus comprises a generator-specific fault vector of the data communication bus wherein space has been reserved for indicating the status of the data communication bus fault of each generator. The fault vector can also comprise a separate part of the processing arrangement of the fault situation, but connectable to the processing arrangement for updating and reading the fault vector. The fault information can, of course, be arranged in other than vector format. The processing element 18 of the fault situation is arranged to also use the identifiers of the generators.

If there are faults in adjacent generators of the network or in the first and last generator of the network, the missing status data of the generator can not be replaced and the part of the network is changed over to droop adjustment.

The terms first and last generator of the network mean generators having the first and last identifier. If the network is a loop, the first and last generator are obviously adjacent. If the network is a line and the data communication faults prevent the first and last generator from sending the information, it is not possible to determine whether the network is a line or a loop.

Figure 8:
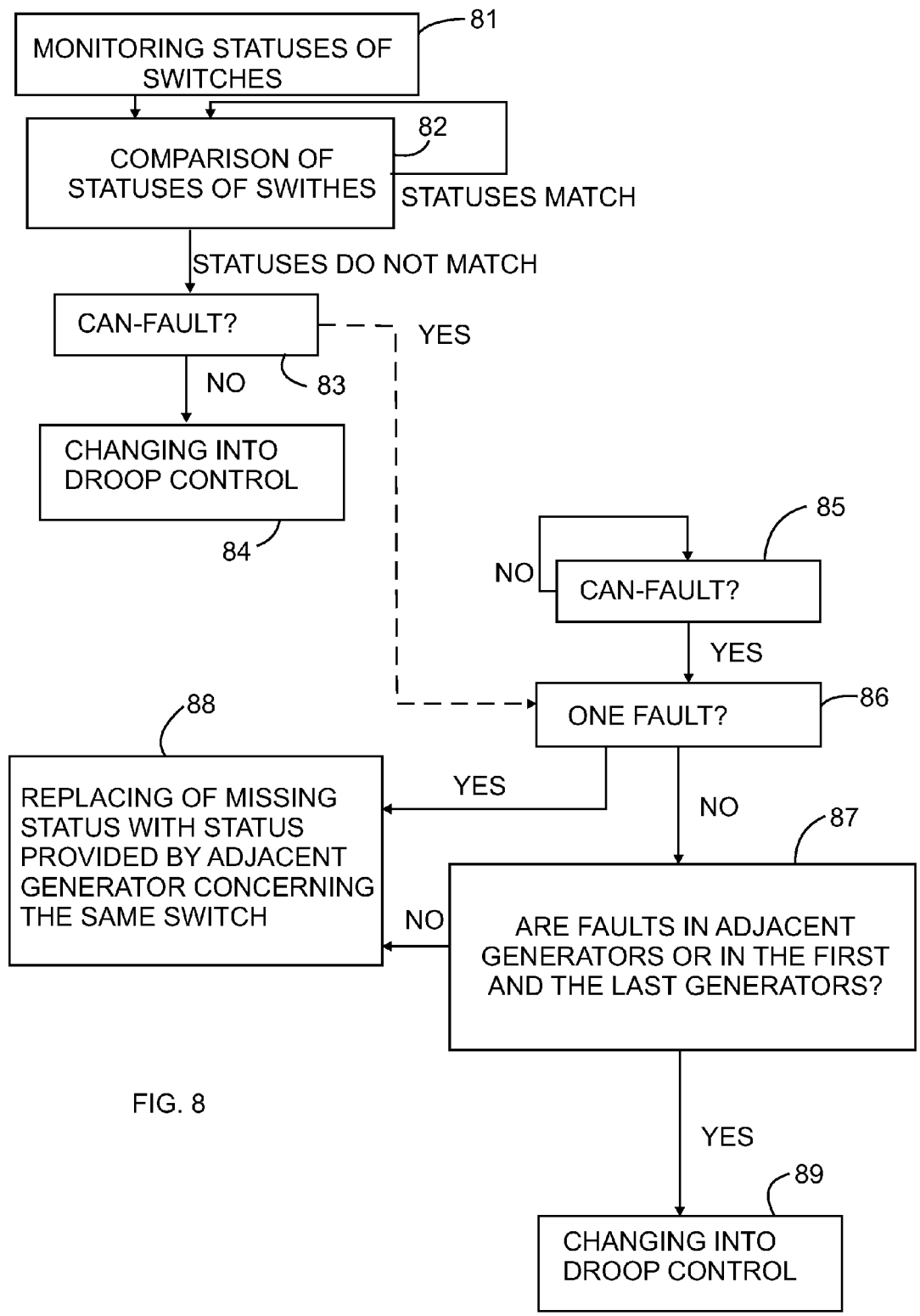
FIG. 8 is an example of the inventive method.

FIG. 8 illustrates a flow chart example of the operation according to the invention. The method comprises the steps of: monitoring 81, 83, 85 the fault situation of the data communication network/bus and the statuses of the switches of the electric power transmission network, comparing 82 fault information regarding the switch, changing 84, 89 into droop control in case the status data of a switch do not correspond in the comparison and when there is no fault situation in the data communication bus or if data communication faults occur in connection with adjacent generators or in connection with the first and last generator of the network 87, replacing 88 the status data of a switch with the status data of the adjacent generator concerning the same switch when there are no data communication faults in connection with adjacent generators or in connection with the first and last generator of the network and the status data of the switch do not correspond in the comparison.

The example of FIG. 8 only illustrates one embodiment of the invention, the same steps can also arranged for another kind of execution. The flow diagram of FIG. 8 simultaneously illustrates a possible software/IC board design. Steps 81-84 are arranged into a different unit than steps 85-88. The idea has been that the monitoring and processing of the status data of the switches is carried out in a dedicated unit and the data communication bus fault situations are carried out in another unit. The data communication fault is monitored in both units, so the example of FIG. 8 comprises a link between the units. It is, of course, possible that the units are totally separate from each other or that they are integrated into one, larger unit. The monitoring step 81, 83, 95 and the step of comparing the status data of the switches are arranged recurring. The apparatus carrying out the method also performs these steps recurrently.

The sub-steps of the method can also be carried out in a number of ways. In the embodiment of FIG. 8 the system checks 86 during a data communication bus fault situation whether there is only one fault. If there is only one fault, the missing switch data can be replaced by a status data provided by the adjacent generator regarding the same switch. If there are a number of faults, the system must check whether the faults are located in connection with adjacent generators or the first and last generator of the network.

In this disclosure the processing fault situation element 18 is shown as one unit, but it is obvious that it can also be carried out as a distributed, multi-part system. The fault situation processing element can be realized as a software or an electric circuit. The software can be loaded into the memory of the generator and executed in a processor suitable for the purpose. An embodiment for this is an ASIC circuit (Application Specific Integrated Circuit).

In practice, each generator performs the fault situation processing independently. Thus no central unit is needed.

As can be seen, the embodiment according to the invention can be carried out by means of a number of solutions. Thus, it will be apparent that the invention is not limited to the examples mentioned in this text. Thus, any inventive embodiment can be carried out within the scope of the invention.

The invention claimed is:

1. A fault situation processing arrangement of a load distribution system of a local electric power transmission network comprising:
a fault situation processing element designed to be installed into each generator of the electric power transmission network, each generator of the network being connectable to other generators via two connection routes equipped with different switches, the power transmission network being a line or a loop and the generators having consecutive identifiers, and the generators being connected to each other via a data communication bus,
wherein the processing element is arranged to:
monitor a fault situation of the data communication bus and statuses of the switches of the electric power transmission network,
compare the status data concerning the same switch,
change into droop control if the status data of at least one switch does not correspond in the comparison and when there is no fault situation in the data communication bus, or if there are data communication faults in connection with adjacent generators or in connection with the first and last generator of the network,
replace the status data of the switch with the status provided by the adjacent generator concerning the same switch when there are no data communication faults in connection with the adjacent generators or in connection with the first and last generator of the network, and the status data of the switch does not correspond in the comparison.

2. The fault situation processing arrangement according to claim 1, wherein the arrangement is arranged to repeat the monitoring and comparing tasks.

3. The fault situation processing arrangement according to claim 2, further comprising a generator-specific data communication bus fault vector having space reserved therein for indicating the status of the data communication bus fault of each generator.

4. The fault situation processing arrangement according to claim 1, wherein the fault situation processing element is arranged to use the identifiers of the generators.

5. The fault situation processing arrangement according to claim 4, wherein the fault situation processing element is carried out by software.

6. The fault situation processing arrangement according to claim 4, wherein the fault situation processing element is carried out by means of an ASIC circuit or other electrical circuit.

7. The fault situation processing arrangement according to claim 1, wherein the fault situation processing element is installed in a generator.

8. The fault situation processing arrangement according to claim 7, wherein the generator is installed in a power transmission network.

9. A method of processing a fault situation of the load distribution system of a local electric power transmission network, wherein the method is designed to be carried out in each generator of the electric power transmission network, each generator of the network being connectable to other generators via two connection routes having equipped with different switches, the power transmission network being a line or a loop and the generators having consecutive identifiers, the generators being in connection with each other via a data communication bus, and the method comprising the steps of:

monitoring a fault situation of the data communication bus and the statuses of the switches of the electric power transmission network, comparing the status data concerning the same switch, changing into droop control if the status data of at least one switch does not correspond in the comparison and when there is no fault situation in the data communication bus, or if there are data communication faults in connection with adjacent generators or in connection with the first and last generator of the network, replacing the status data of the switch with the status provided by the adjacent generator concerning the same switch when there are no data communication faults in connection with the adjacent generators or in connection with the first and last generator of the network, and the status data of the switch does not correspond in the comparison.

10. The method according to claim 9, wherein, prior to replacing the status data of the switch, the method comprises substeps for determining whether the data communication bus comprises one fault and, if one fault is present, going to the step of replacing the status data of the switch.

11. The method according to claim 9, wherein the monitoring step and the comparison step are arranged to repeat.

* * * * *